US009489602B2

(12) United States Patent
Kobayashi

(10) Patent No.: US 9,489,602 B2
(45) Date of Patent: Nov. 8, 2016

(54) IMAGE FORMING APPARATUS AND METHOD OF FORMING IMAGES

(71) Applicant: Oki Data Corporation, Tokyo (JP)

(72) Inventor: Yasushi Kobayashi, Tokyo (JP)

(73) Assignee: OKI DATA CORPORATION, Tokyo (JP)

(*) Notice: Subject to any disclaimer, the term of this patent is extended or adjusted under 35 U.S.C. 154(b) by 0 days.

(21) Appl. No.: 14/628,762

(22) Filed: Feb. 23, 2015

(65) Prior Publication Data

US 2015/0242733 A1    Aug. 27, 2015

(30) Foreign Application Priority Data

Feb. 26, 2014    (JP) ................................ 2014-034984

(51) Int. Cl.
| G06K 15/02 | (2006.01) |
| G03G 15/00 | (2006.01) |
| H04N 1/405 | (2006.01) |

(52) U.S. Cl.
CPC ....... *G06K 15/1878* (2013.01); *G03G 15/6585* (2013.01); *G06K 15/1881* (2013.01); *G03G 2215/0141* (2013.01)

(58) Field of Classification Search
CPC ................ G06K 15/1878; G06K 15/1881; G03G 15/6585; G03G 2215/0141
USPC ..................... 358/3.2, 3.06, 1.9, 1.11; 347/9
See application file for complete search history.

(56) References Cited

U.S. PATENT DOCUMENTS

| 6,844,941 | B1 | 1/2005 | Sharma et al. | |
| 8,576,451 | B2 * | 11/2013 | Wang ..................... | H04N 1/405 345/596 |
| 2006/0072159 | A1 * | 4/2006 | Eschbach ............... | B41M 3/148 358/3.06 |
| 2009/0237429 | A1 * | 9/2009 | Watanabe .............. | B41J 2/2114 347/9 |
| 2011/0102488 | A1 * | 5/2011 | Usuda .................... | B41J 2/2114 347/14 |

FOREIGN PATENT DOCUMENTS

| JP | 2007-241068 A | 9/2007 |
| WO | WO 2006-028230 A1 | 3/2006 |

* cited by examiner

*Primary Examiner* — Quang N Vo
(74) *Attorney, Agent, or Firm* — Rabin & Berdo, P.C.

(57) ABSTRACT

An image forming apparatus, method, and system are disclosed. The apparatus includes first and second image forming sections; a selector that selects one of a first halftone screen for a first printing mode in which the first image forming section forms a first image on the print medium, and a second halftone screen for a second printing mode in which the first image forming section forms the first image on the print medium and the second image forming section forms a second image on the first image so that the first image and the second image are printed one over the other. The first and second halftone screens include respective first and second numbers of raster lines per unit, the first halftone screen and the second halftone screen being different in the number of raster lines; a controller; and a discharging section.

15 Claims, 10 Drawing Sheets

IMAGE FORMING APPARATUS AND METHOD OF FORMING IMAGES

BACKGROUND OF THE INVENTION

1. Field of the Invention

The present invention relates to an image forming apparatus and a method of forming images, and is advantageously applied to an image forming apparatus that uses color toners and a white toner to form images on a recording medium.

2. Description of the Related Art

A conventional printer receives image data from a computer and prints the received image data. The printer includes a plurality of image forming units, each unit being capable of forming an image of a corresponding color.

The printer includes four image forming units that form cyan, magenta, yellow, and black, respectively. The printer may also have an image forming unit that forms a white image in addition to the four image forming units. The white image forming unit prints a solid white image on an entire printable area of a recording medium before color images are printed. The white image forming unit is advantageous when underlayer printing is performed. Underlayer printing is advantageous when an image is printed on a non-white recording medium. A solid white image is first printed directly on the non-white recording medium, thereby covering the non-white recording medium. Color images are then layered one over the other on the solid white image.

The white image forming unit may also be used to print a white-only image with gradation levels on a non-white recording medium.

Image forming apparatus are expected to be capable of printing not only a multi-color image but also an image of a single color or a limited number of colors with good print quality.

SUMMARY OF THE INVENTION

The present invention was made to provide a printer capable of printing high quality images.

An object of the invention is provide an image forming apparatus capable of printing good quality images.

An image forming apparatus includes an image forming section, a determining section, and selector.

The image forming section performs one of a first printing mode in which an image is formed only of a first color developer material of a first color, and a second printing mode in which an image is formed of the first color developer material and a second color developer material, the second color being at least one of a plurality of colors other than the first color. The determining section is configured to determine in which of the first printing mode and the second printing mode an image should be formed. The selector is configured to select a halftone screen from among a plurality of halftone screens in accordance with the determination made by the determining section, the halftone screen being selected when the image forming section forms the image. using the first color developer material.

A method for forming an image, includes:

determining in which of a first printing mode and a second printing mode an image should be formed, the first printing mode being such that the image is formed only of a first color developer material and the second printing mode being such that the image is formed with the first color developer material and a second color developer material;

using a first halftone screen to form the image with the first color developer material when the first printing mode is selected; and using a second halftone screen to form the image with the first color developer material when the second printing mode is selected.

An image forming system configured to form an image using a first color developer material and a second color developer material different from the first color developer material, the image forming system includes a host apparatus configured to produce print data and an image forming apparatus configured to form an image based on the print data. The host apparatus includes a controller is configured to produce print data for a first image based on a first halftone screen when the first image is formed only of a first color developer material, and produce print data for a second image based on a second halftone screen when the second image is formed of the first color developer material and a second color developer material. The image forming apparatus includes a print engine that prints the image on a medium and a print engine controller configured to drive print engine when the print engine prints the image.

BRIEF DESCRIPTION OF THE DRAWINGS

The present invention will become more fully understood from the detailed description given hereinbelow and the accompanying drawings which are given by way of illustration only, and wherein.

DETAILED DESCRIPTION OF THE INVENTION

The present invention will be described in detail by way of preferred embodiments with reference to the accompanying drawings.

First Embodiment

Figure 1:
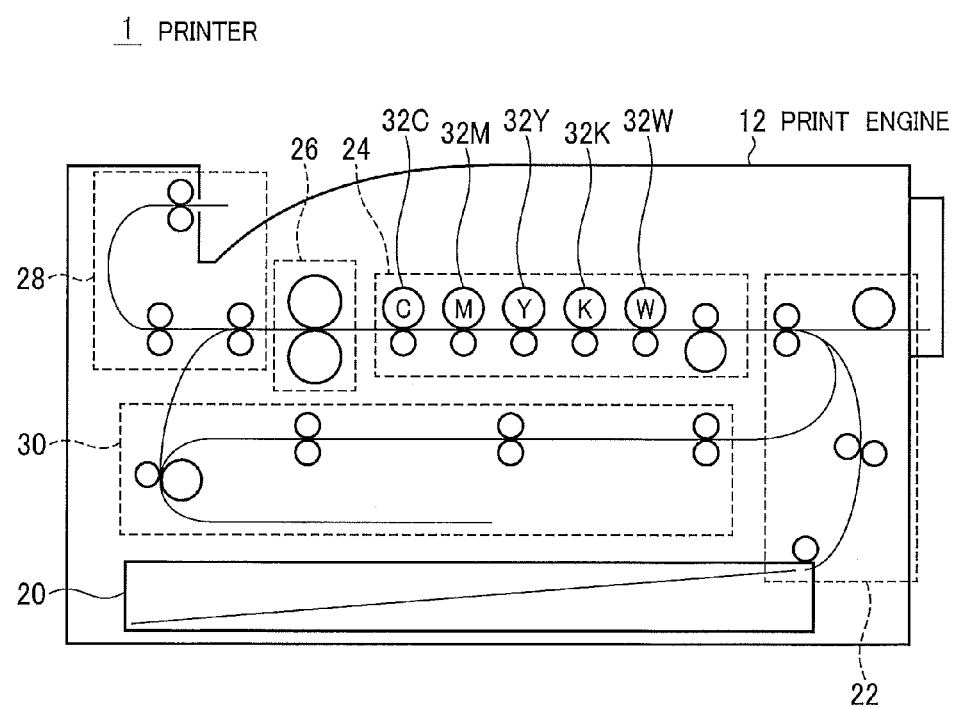
FIG. 1 is a side cross-sectional view of a printer.
Figure 2:
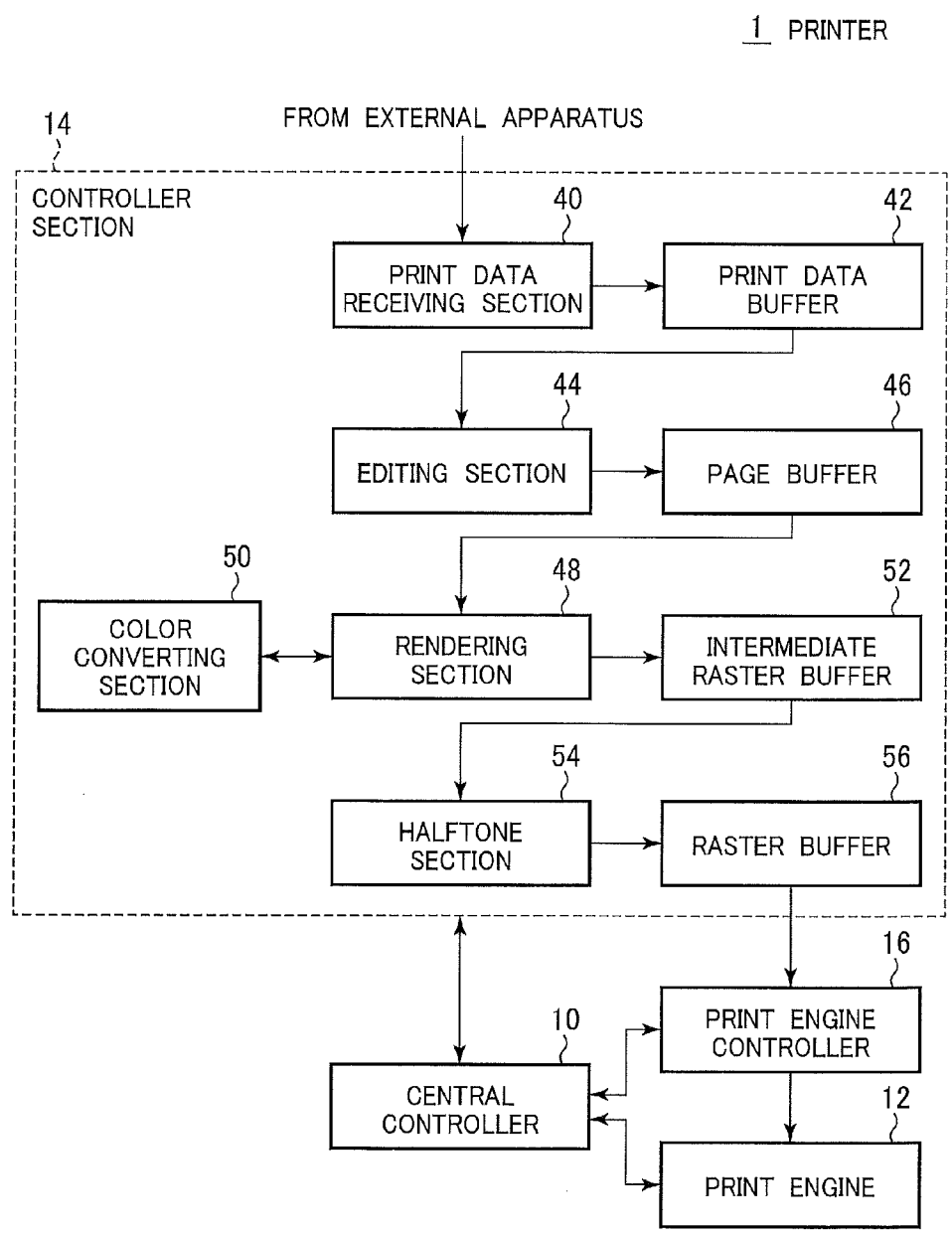
FIG. 2 is a partial block diagram illustrating the functional relations among various sections of the printer.

FIG. 1 is a side cross-sectional view of a printer 1, illustrating the outline thereof. The printer 1 is an electrophotographic color printer. FIG. 2 is a partial block diagram illustrating the functional relations among a print engine 12, a controller 14, and a print engine controller 16, and various sections of the controller 14. Referring to FIG. 1, the print engine 12 includes a paper cassette 20, a paper feeding section 22, an image forming section 24, a fixing section 26, a discharging section 28, and a duplex unit 30.

The paper cassette 20 holds vertically stacked sheets of recording medium. When printing, the recording medium is fed on a sheet-by-sheet basis from the paper cassette 20 to the image forming section 24. The image forming section 24 performs printing on the sheet of recording medium in accordance with the print data of a print job obtained from an external apparatus (e.g., computer).

The image forming section 24 includes five image forming units 32C, 32M, 32Y, 32K, and 32W that print cyan, magenta, yellow, black, and white images, respectively. The image forming units 32C, 32M, 32Y, 32K, and 32W are LED digital color printer units, and are aligned in this order. The image forming units 32C, 32M, 32Y, 32K, and 32W are driven by corresponding motors. Each of the image forming units 32C, 32M, 32Y, 32K, and 32W includes a photoconductive drum, a charging roller, an LED head, a developing roller, and a transfer roller, which are not shown. The photoconductive drum rotates in a predetermined direction, and the charging roller uniformly charges the surface of the photoconductive drum. The LED head illuminates the charged surface of the photoconductive drum in accordance with image information to form an electrostatic latent image of a corresponding color on the photoconductive drum. A developing roller supplies toner of a corresponding color to the electrostatic latent image formed on the photoconductive drum, thereby developing the electrostatic latent image into a toner image of the corresponding color. The transfer roller transfers the toner image formed on the photoconductive drum onto the recording medium. The image forming section 24 forms a white (W) image, a black (K) image, a yellow (Y) image, a magenta (M) image and a cyan (C) image, so that these color images (W), (K), (Y), (M), and (C) are transferred onto the recording medium in this order. When printing is performed on a non-white recording medium, a solid white image is transferred first onto the recording medium to cover the base color of the non-white recording medium, and then color images are layered one over the other on the solid white image. In this manner, an image can be obtained which has as good color development as an image printed on a white recording medium. Printing a solid white image on a recording medium is referred to as underlayer printing.

The image forming section 24 transports the recording medium having the toner image thereon to the fixing section 26. The fixing section 26 includes a heat roller and a pressure roller, which cooperate with each other to fix the toner image on the recording medium under heat and pressure, and to transport the recording medium toward the discharging section 28.

The discharging section 28 discharges the recording medium onto a discharge tray. The duplex unit 30 is disposed downstream of the fixing section 26, and transports the recording medium to the entrance of the image forming section 24. The duplex unit converts the trailing edge of the recording medium back to the leading edge of the recording medium so that the recording medium is turned over when the recording medium enters the print engine 12. The image forming section 24 then prints an image on the back surface of the recording medium where no image has been printed yet.

{Functions of Printer}

As shown in FIG. 2, a central controller 10 centrally controls various sections in the printer 1. The central controller 10 includes a central processing unit (CPU) (not shown) which reads a variety of programs from a read only memory (ROM) and executes the programs to control various sections of the printer 1. The control is performed using a random access memory (RAM).

The controller 14 includes a print data receiving section 40, a print data buffer 42, an editing section 44, a page buffer 46, a rendering section 48, a color converting section 50, an intermediate raster buffer 52, a halftone section 54, and a raster buffer 56.

The print data receiving section 40 serves as an interface for a network or a universal serial bus (USB). The print data receiving section 40 receives the print data from an external apparatus, and stores the print data into the print data buffer 42. The editing section 44 reads the print data from the print data buffer 42, and parses commands to produce image data on a page-by-page basis before being converted into display codes. The editing section 44 then sends the display codes to the page buffer 46, which in turn temporarily stores the display codes and then supplies the display codes to the rendering section 48.

The print data has image signals with 8-bit values (i.e., halftone levels of 0 to 255) for colors R, G, and B, colors C, M, Y, and K, or colors C, M, Y, K, and W. By using the 8-bit values, halftone levels in the range of 0% to 100% can be expressed. Normal color images in the print data are expressed using R, G, and B image signals, C, M, Y, and K image signals, or C, M, Y, K, and W image signals. A white-only image is an image formed only of the white toner and is formed on, for example, a black paper or a transparent medium. The white-only image is expressed using the C, M, Y, K, and W image signals with the C, M, Y, and K components reduced to zero (i.e., a minimum value of the 8-bit value or a halftone level of 0%).

The rendering section 48 reads the display codes for one page from the page buffer 46, and supplies the R, G, and B image signals, C, M, Y, and K image signals, or C, M, Y, K, and W image signals contained in the display codes to the color converting section 50. The color converting section 50 in turn converts the R, G, and B image signals, C, M, Y, and K image signals, or C, M, Y, K, and W image signals into C', M', Y', K', and W' image signals, which will be described later, and then supplies the C', M', Y', K', and W' image signals to the rendering section 48. This signal processing performed by the color converting section 50 is referred to as a color conversion process in this specification. The rendering section 48 converts the C', M', Y', K', and W' image signals for one page obtained from the color converting section 50 into raster images. The raster images are the 8-bit C, M, Y, and K image signals which express corresponding C, M, Y, K, and W signals, respectively. The rendering section 48 then stores the raster images into the intermediate raster buffer 52. The signal processing performed by the rendering section 48 is referred to as a rendering process. The intermediate raster buffer 52 temporarily stores the raster images produced by the rendering section 48, and then supplies the raster images to the halftone section 54. The halftone section 54 reads the raster images, which are C, M, Y, and K image signals having 8-bit values, for one page from the intermediate raster buffer 52, and then converts them into 8-bit C, M, Y, K, and W image signal values. Each of the 1-bit C, M, Y, K, and W image signal values is a 1-bit signal so that the printer engine 12 can print a corresponding color dot on the recording medium. The halftone section 54 then stores the 1-bit C, M, Y, K, and W image signal values into the raster buffer 56. The signal processing performed by the halftone section 54 is referred to as a halftone process in this specification. The raster buffer 56 temporarily stores the raster images, which are expressed in 1-bit C, M, Y, K, and W image signal values produced by the halftone section 54. The raster buffer 56 then supplies the raster images to the print engine controller 16. The print engine controller 16 reads the raster images for one page from the raster buffer 56, and drives the print engine 12 to print the raster images on the recording medium.

{Configuration of Color Converting Section}

Figure 3:
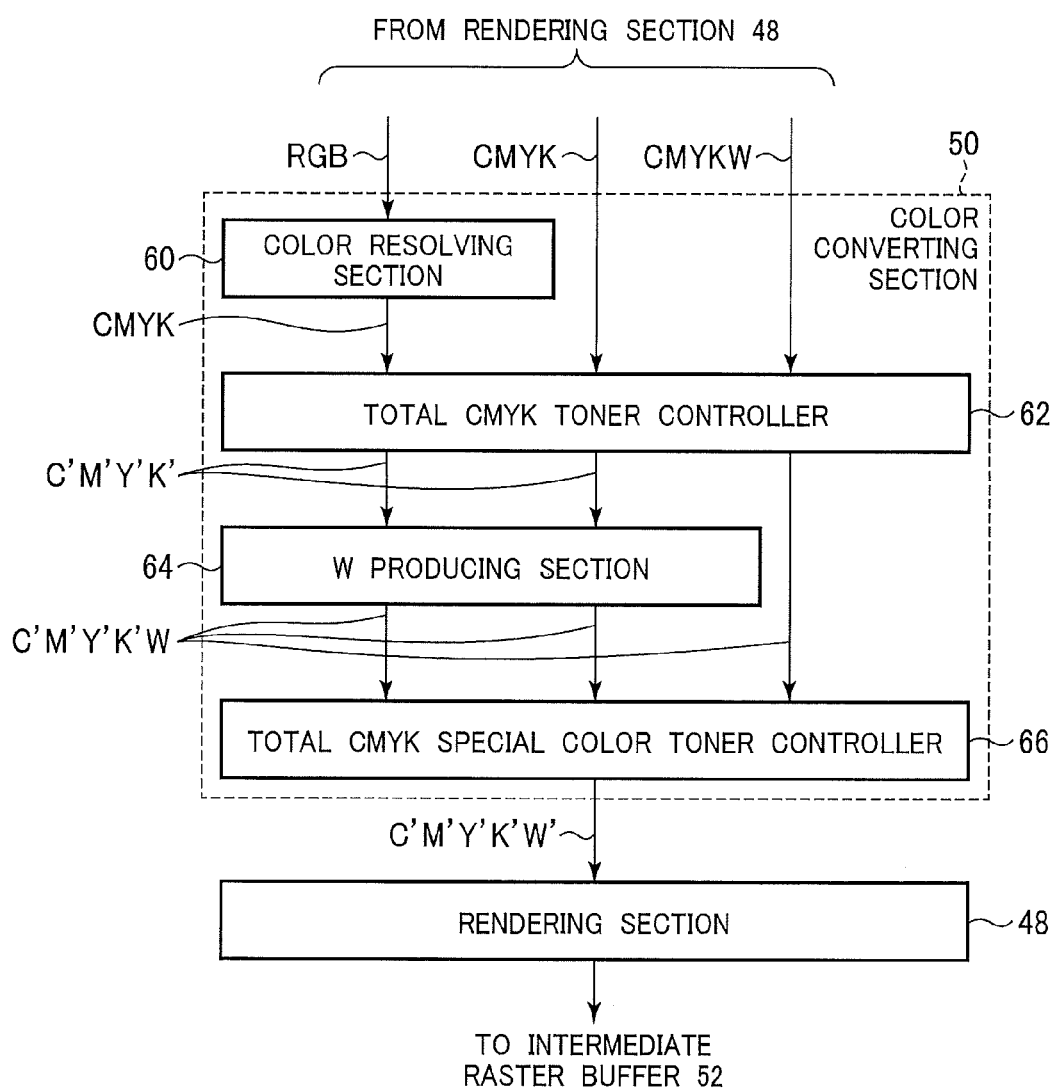
FIG. 3 illustrates the configuration of a color converting section.

FIG. 3 illustrates the configuration of the color converting section 50. The color converting section 50 includes a color resolving section 60, a total CMYK toner controller 62, a W producing section 64, and a total CMYKW toner controller 66. The color converting section 50 receives R, G, and B image signals, C, M, Y, and K image signals, or C, M, Y, K, and W image signals from the rendering section 48.

Alternatively, instead of receiving the C, M, Y, K, and W image signals, the color converting section 50 may be configured to receive C, M, Y, and K image signals and a single-color image signal other than the C, M, Y, and K image signals. Still alternatively, the color converting section 50 may be configured to receive C, M, Y, and K image signals and a single colorless-and-transparent image signal other than the C, M, Y, and K image signals instead of the C, M, Y, K, and W image signals.

The color resolving section 60 converts the RGB image signals received from the rendering section 48 into the C, M, Y, and K image signals, and then supplies the thus produced C, M, Y, and K image signals to the total CMYK toner controller 62.

{CMYK Total Amount Controlling Process}

The total CMYK toner controller 62 obtains the C, M, Y, and K image signals from the color resolving section 60 or the rendering section 48. Alternatively, the total CMYK toner controller 62 obtains the C, M, Y, K, and W image signals from the rendering section 48. The total CMYK toner controller 62 then performs a CMYK total amount controlling process on the C, M, Y, and K image signals or the C, M, Y, K, and W image signals so that the upper limit of the total amount of the C, M, Y, and K toners, which is pre-assigned to the printer 1, is not exceeded. The total amount of the C, M, Y, and K is the sum of the amount of the C, M, Y, and K toners that can be fused when the recording medium passes through the fixing section. The CMYK total amount controlling process is carried out in order to produce high quality images. When the total CMYK toner controller 62 receives the C, M, Y, K, and W image signals from the rendering section 48, the total CMYK toner controller 62 performs the CMYK total amount controlling process on the C, M, Y, and K components of the C, M, Y, K, and W image signals.

Specifically, the total CMYK toner controller 62 defines the total amount of the C, M, Y, and K toner as Sum (C, M, Y, K), which is a sum of image signal values of the C, M, Y, and K image signals, and the upper limit of the total amount of the C, M, Y, and K toners as SumMax. If the total amount of the C, M, Y, and K toner is larger than the upper limit of C, M, Y, and K toners, or Sum (C, M, Y, K)>SumMax, the total CMYK toner controller 62 converts the C, M, Y, K, and W image signal values into the C', M', Y', and k' image signal values using Equation (1)

$$C'=C-\{Sum(C,M,Y,K)-SumMax\}/4$$

$$M'=M-\{Sum(C,M,Y,K)-SumMax\}/4$$

$$Y'=Y-\{Sum(C,M,Y,K)-SumMax\}/4$$

$$K'=K-\{Sum(C,M,Y,K)-SumMax\}/4 \quad (1)$$

If the total CMYK is equal to or less than the upper limit of C, M, Y, and K toners, or Sum (C, M, Y, K) SumMax, the total CMYK toner controller 62 converts the C, M, Y, and K image signal values into the C', M', Y', and K' image signal values using Equation (2), thereby producing the C', M', Y', and K' image signals.

$$C'=C$$

$$M'=M$$

$$Y'=Y$$

$$K'=K \quad (2)$$

The CMYK total amount controlling process will be described by way of specific image signal values. Assume that the upper limit of the total amount of the C, M, Y, and K toners, that is, the sum of the C, M, Y, and K toners, is 638, which is 250% of the 8-bit value of 255. Note that 8-bit expresses a maximum value of 255.

Also, assume that the following are the C, M, Y, K, and W image signal values of an image signal inputted into the total CMYK toner controller 62:

C=255(100%)

M=255(100%)

Y=255(100%)

K=128(50%)

Thus, the sum of the C, M, Y, K, and W image signal values is 255+255+255+128=893 (350%), which is larger than the upper limit of the total amount of C, M, Y, and K toners. Therefore, the total CMYK toner controller 62 calculates the value of C', M', Y', and K' using Equation (3).

$$C'=255-(893-638)/4=191$$

$$M'=255-(893-638)/4=191$$

$$Y'=255-(893-638)/4=191$$

$$K'=128-(893-638)/4=64 \quad (3)$$

In this manner, the total CMYK toner controller 62 converts the C, M, Y, and K image signal values of the C, M, Y, and K image signals from 255, 255, 255, and 128 to 191, 191, 191, and 64, respectively, thereby producing the C', M', Y', and K' image signals.

{W Producing Process}

The W producing section 64 obtains the C', M', Y', and K' image signals, which have been subjected to the CMYK total amount controlling process, from the total CMYK toner controller 62, and then performs the W producing process on the C', M', Y', and K' image signals. The W producing process is such that a W image signal that describes an amount of white toner for underlayer printing is produced.

The W producing section 64 produces the W image signal having a value of 255 (100%) irrespective of the image signal value of the inputted C', M', Y' and K' image signals, thereby producing the W image signal for underlayer printing. However, when the W producing section 64 receives the C, M, Y, K, and W image signals from the rendering section 48, the W producing section 64 does not perform the W producing process. This is because formation of the white underlayer is detrimental to expressing halftone on a non-white print medium using white toner only.

Specifically, when the C', M', Y', and K' image signals have signal values 191 (75%), 191 (75%), 191 (75%), and 64 (25%), respectively, the W producing section 64 outputs the C', M', Y', K', and W image signals having values of 191 (75%), 191 (75%), 191 (75%), 64 (25%), and 255 (100%), respectively.

{CMYKW Total Amount Controlling Process}

The total CMYKW toner controller 66 obtains the C', M', Y', K', and W image signals from either the W producing section 64 or the total CMYK toner controller 62. The total CMYKW toner controller 66 then performs the CMYKW total amount controlling process in which the signal values of C', M', Y', K', and W image signals are adjusted so that the total signal values, i.e., total amount of C, M, Y, K, and W toners do not exceed the upper limit of the total amount of the C, M, Y, K, and W toners.

Assume that Sum2(C, M, Y, K, W) is a total amount of CMYKW toner which is the sum of the C', M', Y', K', and W image signal values inputted into the total CMYKW toner controller 66, and that SumMax2 is the upper limit of the Sum2(C, M, Y, K, W). If Sum2(C, M, Y, K, W)>SumMax2, the total CMYKW toner controller 66 converts the C', M', Y', K', and W image signal values into C', M', Y', K', and W' image signal values using Equation (4), thereby producing the C', M', T', K', and W' image signals.

The printer 1 is also used to perform underlayer printing in which a solid white image is printed on the recording medium. A solid white toner layer reflects the light transmitting through the color toner layers. When an image is printed in dark colors, the total amount of C, M, Y, and K toners is large, and therefore most of light incident on the image is absorbed by the color toner layers and does not reach the white toner layer. In such a case, the white solid toner layer is not essential. For this reason, when Sum2(C, M, Y, K, W)>SumMax2, the white toner is reduced so that the total amount of the C, M, Y, K, and W toners does not exceed the upper limit.

$$W'=W-\{Sum2(C,M,Y,K,W)\text{SumMax2}\} \quad (4)$$

On the other hand, if Sum2 (C, M, Y, K, W)<SumMax2, the total CMYKW toner controller 66 converts the C', M', Y', K', and W image signal values into the C', M', Y', K', and W' image signal values, the W' image signal value being obtained by the use of Equation (5).

$$W'=W \quad (5)$$

In this manner, the C', M', Y', K', and W' image signals are produced.

Using specific image signal values, a description will be given of the CMYKW total amount controlling process.

Assume that the upper limit of the amount of total C, M, Y, K, and W toners is 765, which is 300% of 255. Also, assume that the C', M', Y', K', and W image signals inputted to the total CMYKW toner controller 66 have values C'=191 (75%), M'=191 (75%), Y'=191 (75%), K'=64 (25%), and W=255 (100%), respectively. The sum of the C', M', Y', K', and W image signal values is 191+191+191+64+255=892 (350%), which exceeds the upper limit of the total amount of the C, M, Y, K, and W toners. Therefore, the total CMYKW toner controller 66 calculates the value of W' image signal using Equation (4) as follows:

$$W'=255-(892-765)=128 \quad (6)$$

In this manner, the total CMYKW toner controller 66 converts the signal value of W image signal of the C', M', Y', K', and W image signals from a signal value of 255 into a signal value of 128, thereby providing the C', M', Y', K', and W' image signals.

{Configuration of Halftone Section}

Figure 4:
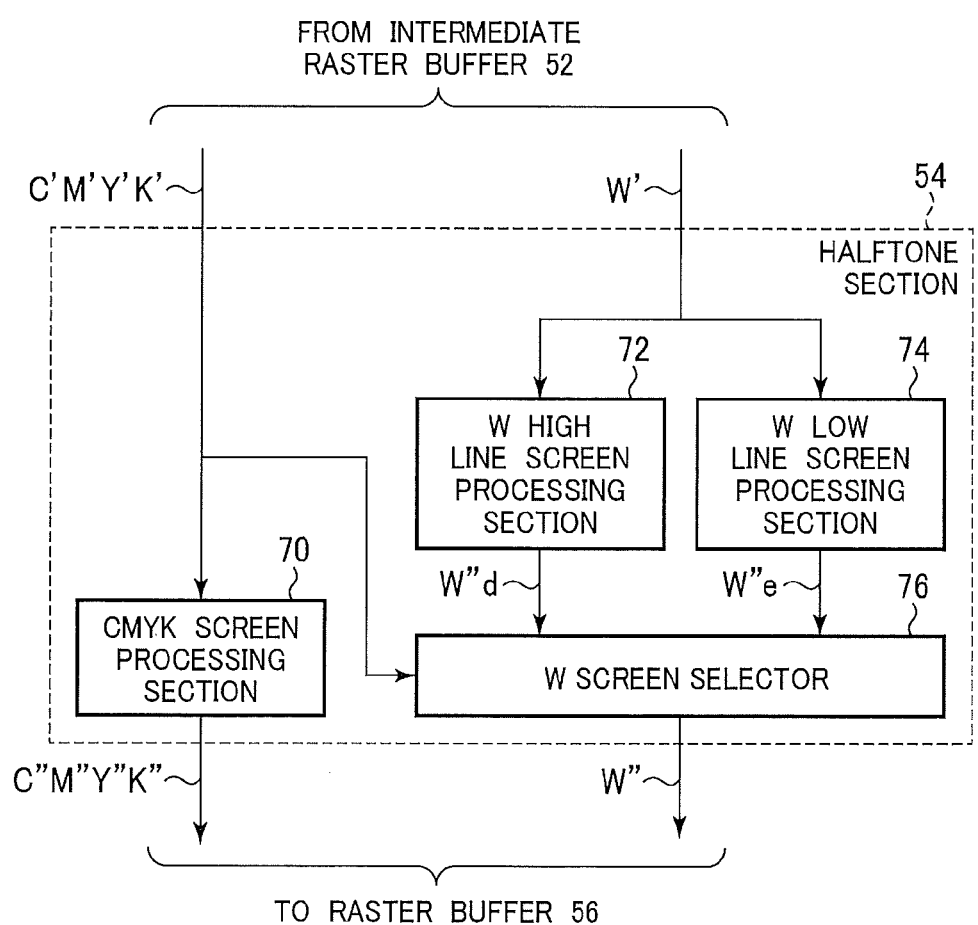
FIG. 4 illustrates the configuration of a halftone section.

FIG. 4 illustrates the configuration of the halftone section 54. The halftone section 54 includes a CMYK screen processing section 70, a W large-number-of-lines screen processing section 72, a W small-number-of-lines screen processing section 74, and a W screen selector 76.

Using dithering, the CMYK screen processing section 70 converts the C', M', Y', and K' image signals of the C', M', Y', K', and W', which are 8-bit C, M, Y, K, and W image signals obtained from the intermediate raster buffer 52, into C'', M'', Y'', and K'' image signals. The CMYK screen processing section 70 then supplies the thus produced C'', M'', Y'', and K'' image signals to the raster buffer 56. Specifically, the CMYK screen processing section 70 converts the 8-bit C image signal value into a 1-bit C image signal value, the 8-bit M image signal value into a 1-bit M image signal value, the 8-bit Y image signal value into a 1-bit Y image signal value, and the 8-bit K image signal value into a 1-bit K image signal value.

Figure 5A:
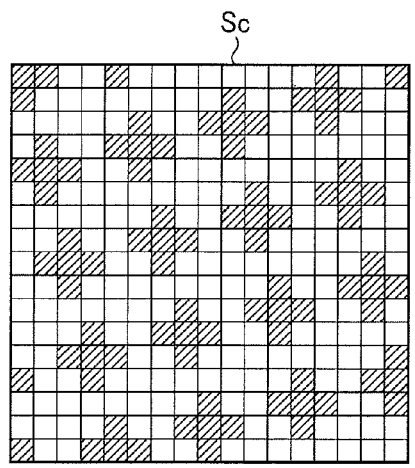
FIGS. 5A-5D illustrate halftone screens in which halftone images of C, M, Y, and K are printed at a resolution of 600 dpi and at a halftone level of about 25%.
Figure 5B:
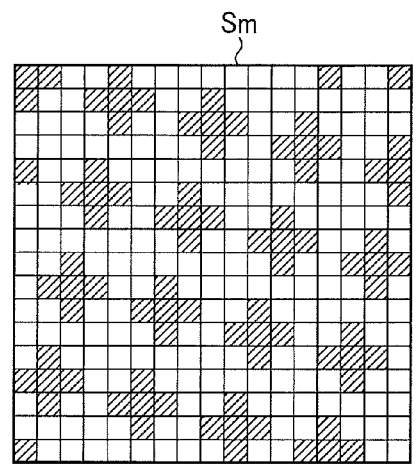
Figure 5C:
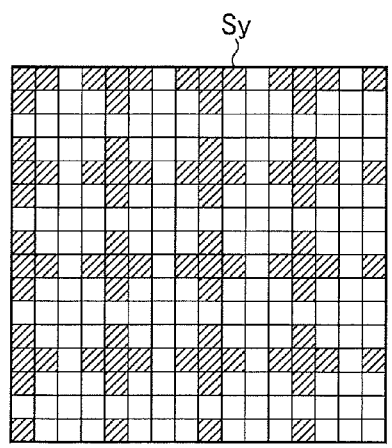
Figure 5D:
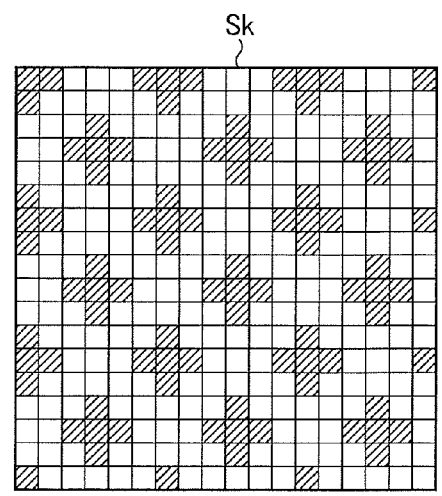

The screen angle of the C, M, Y, and K raster images is selected such that when the respective color images are printed one over the other, no Moire interference occurs. Just as in ordinary offset printing, the screen angles are selected to be 14 degrees for C, 76 degrees for M, 60 degrees for Y, and 45 degrees for K. The resolution of a halftone screen is measured in lines per inch (lpi). This is the number of lines of dots in one inch, measured parallel with the screen's angle. The raster lines are printed at a resolution of 140 to 150 lines per inch (lpi) to minimize granular quality, which may appear due to the nature of electrophotographic process. FIGS. 5A-5D illustrate halftone screens in which halftone images of C, M, Y, and K are printed at a resolution of 600 dpi and at a halftone level of about 25%. FIG. 5A illustrates a screen Sc for cyan (C) in which the raster lines are printed at a resolution of 146 lpi at a screen angle of 14 degrees. FIG. 5B illustrates a screen Sm for magenta (M) in which the raster lines are printed at a resolution of 146 lpi at a screen angle of 76 degrees. FIG. 5C illustrates a screen Sy for yellow (Y) in which the raster lines are printed at a resolution of 150 lpi at a screen angle of 90 degrees. FIG. 5D illustrates a screen Sk for black (K) in which the raster lines are printed at a resolution of 141 lpi at a screen angle of 45 degrees. The term "color screen" covers the screens Sc, Sm, Sy, and Sk.

The W large-number-of-lines screen processing section 72 receives the C', M', Y', K', and W' image signals having an 8-bit value from the intermediate raster buffer 52, and converts the W' image signal into a W''' image signal having a 1-bit W image signal value.

Figure 6A:
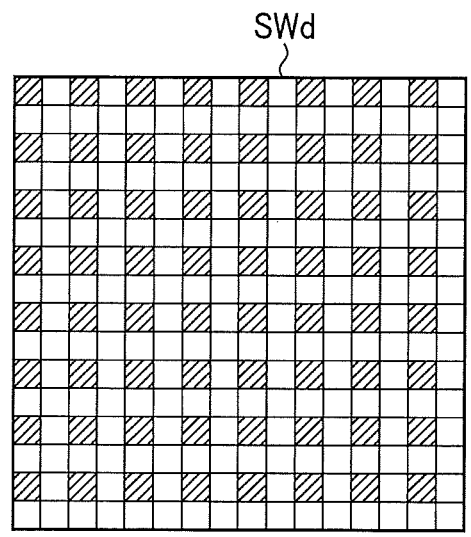
FIG. 6A illustrates a W high line screen.

FIG. 6A illustrates a W high line screen SWd. Specifically, a W''d image signal for each pixel is obtained by dithering a W high line screen SWd expressed in a halftone level of about 25% at a resolution of 600 dots per inch (dpi) as shown in FIG. 6A. The W large-number-of-lines screen processing section 72 then supplies the obtained W''d image signal to the W screen selector 76. In this specification, this process is referred to as a W large-number-of-lines screen process.

The screen angle and the number of raster lines in the W high line screen SWd are selected such that no Moire interference occurs when the respective color images are printed one over the other. Specifically, the raster lines are inclined by 90 degrees and printed at a resolution of 300 lpi. The W large-number-of-lines screen processing section 72 selects the number of raster lines for W to be more than twice that of each of C, M, Y, and K, thereby preventing Moire interference, which may occur when color toner layers (including black toner) are placed on a white toner-'layer. In this case, granular quality associated with the electrophotographic process is apt to become poor. However, if color toner layers are placed on a solid white layer in underlayer printing, granular quality associated with the white toner layer is not detectable.

Figure 6B:
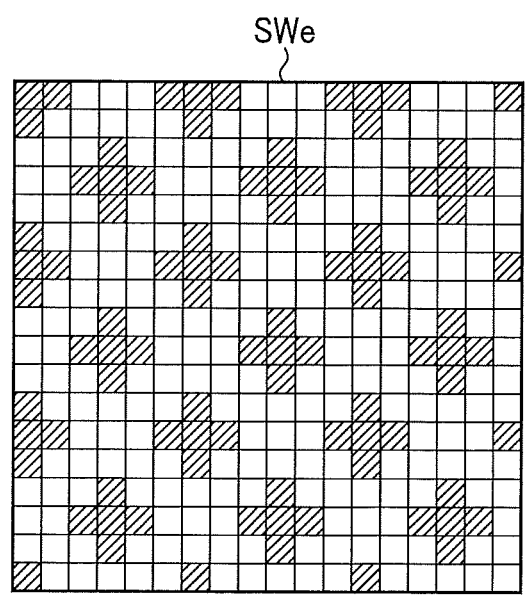
FIG. 6B illustrates a W low line screen.

FIG. 6B illustrates a W low line screen SWe. The W small-number-of-lines screen processing section 74 receives the C', M', Y', K', and W' image signals having an 8-bit value from the intermediate raster buffer 52, and then converts the W' image signal into a W"e image signal for a pixel having a 1-bit W image signal value. Specifically, the W"e image signal, which has a 1-bit W image signal value, obtained by dithering a W low line screen SWe expressed in a halftone level of about 25% at a resolution of 600 dpi as shown in FIG. 6B. The W small-number-of-lines screen processing section 74 then supplies the obtained W"e image signal to the W screen selector 76. This process is referred to as a W small-number-of-lines screen process.

When a white-only toner image is printed, the W small-number-of-lines screen processing section 74 produces the W low line screen SWe such that the whit toner image is printed at a resolution of 141 lpi, thereby minimizing granular quality associated with electrophotographic process. The W low line screen SWe in white-only printing is essentially free from Moire interference associated with the C, M, Y, and K toner images formed one over the other, and therefore the screen angle of the W low line screen SWe is set to 45 degrees, which makes it difficult for human eye to recognize halftone dots. The term "white screen" covers the W high line screen SWd and the W low line screen SWe in this specification.

The W small-number-of-lines screen processing section 74 uses the W low line screen SWe which has a lower resolution than the W high line screen SWd, so that granular quality in white-only printing can be minimized. No color toner layer is formed on the white toner layer in white-only printing, and hence no Moire interference which may occur between a white toner layer and color toner layers.

The W screen selector 76 obtains the C', M', Y', and K' image signals of the C', M', Y', K', and W' image signals from the intermediate raster buffer 52. The W screen selector 76 also obtains the W"d image signal from the W large-number-of-lines screen processing section 72, and the W"e image signal from the W small-number-of-lines screen processing section 74. The W screen selector 76 (determining section) determines the image signal values of the C', M', Y', K', and W' image signals. In accordance with the determination, the W screen selector 76 (selector) selects either a 1-bit W"d image signal that has been subjected to the W high line screen process, or a 1-bit W"e image signal that has been subjected to the We low line screen process. The W screen selector 76 then supplies the selected image signal as the W"' image signal to the raster buffer 56 (FIG. 2).

Specifically, when the C, M, Y, and K signal values are 0 (i.e., C'=0, M'=0, Y'=0, and K'=0 when expressed as 8-bit values), the W screen selector 76 outputs the W"d image signal as the W"' image signal. When at least one of the C, M, Y, and K signal values is equal to or larger than "1," the W screen selector 76 outputs the W"e image signal as a W"' image signal. In this manner, the W screen selector 76 outputs the W"' image signal, which has been subjected to the W low line screen process, for forming an image in the white-only printing. Likewise, the W screen selector 76 outputs the W"' image signal, which has been subjected to the W high line screen process, for forming a white toner underlayer in underlayer printing.

{Printing Process}

Figure 7:
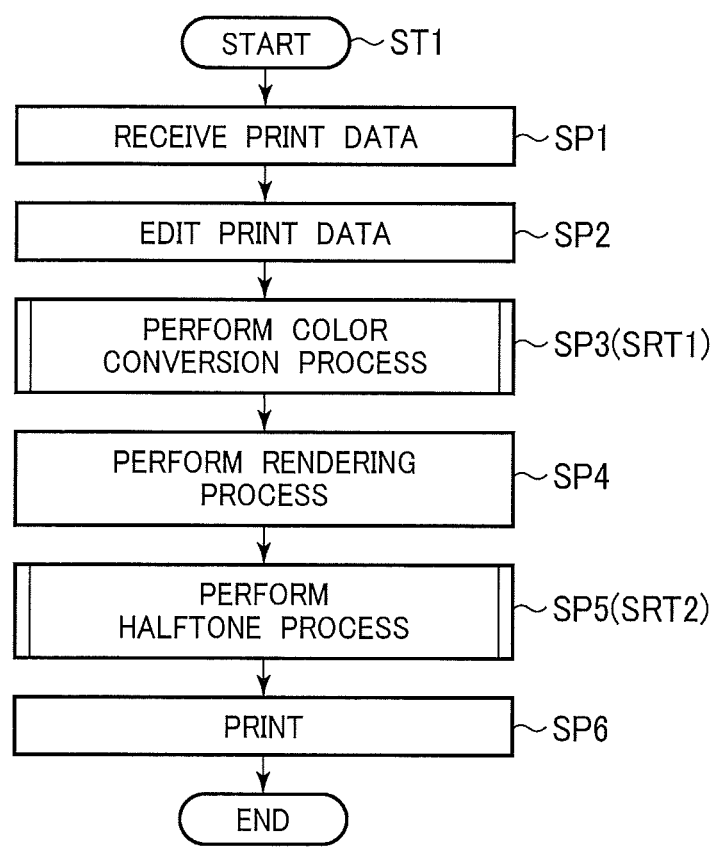
FIG. 7 is a flowchart illustrating a printing process performed by the printer.

FIG. 7 is a flowchart illustrating the printing process performed by the printer 1. With reference to FIG. 7, a description will be given of the printing process performed by the printer 1. The central controller 10 reads a printing program from a ROM, and then executes the printing program, thereby starting a printing procedure RT1.

Step SP1: The controller 14 receives the print data from an external apparatus through the print data receiving section 40, and temporarily stores the print data into the print data buffer 42.

Step SP2: The controller 14 drives the editing section 44 to edit the print data. Specifically, the editing section 44 reads the print data including commands from the print data buffer 42, and parses the commands to produce image data on a page-by-page basis. The editing section 44 then converts the image data into the display codes. The editing section 44 then stores the display codes into the page buffer 46.

Step SP3: The controller 14 drives the color converting section 50 to perform a color conversion process in which the 8-bit C, M, Y, K, and W image signal values are produced. Specifically, the rendering section 48 reads the display codes for one page from the page buffer 46, and supplies the R, G, and B image signals C, M, Y, and K image signals, or C, M, Y, K, and W image signals contained in the display codes to the color converting section 50. The color converting section 50 receives the image data from the rendering section 48 and converts the image signal values of the image data into the 8-bit C, M, Y, K, and W image signal values, and then sends the 8-bit C, M, Y, K, and W image signal values back to the rendering section 48.

Step SP4: The controller 14 drives the rendering section 48 to perform a rendering process to render the print data into the raster image. Specifically, the rendering section 48 converts the image information for one page into the 8-bit C, M, Y, K, and W raster images before storing into the intermediate buffer 52.

Step SP5: The controller 14 starts the procedure of a halftone process SRT2 shown in FIG. 9, which will be described later. Specifically, the halftone section 54 performs a halftone process SRT2 in which the halftone section 54 reads the raster images of the C, M, Y, K, and W image signals from the intermediate raster buffer 52, and converts the raster images into the C", M", Y", K", and W" image signals, which are the 1-bit C, M, Y, K, and W image signal values, respectively, and can be printed by the print engine 12.

Step SP6: The print engine controller 16 reads the raster image for one page from the raster buffer 56, and then drives the print engine 12 to print the raster image.

{Color Conversion Process}

Figure 8:
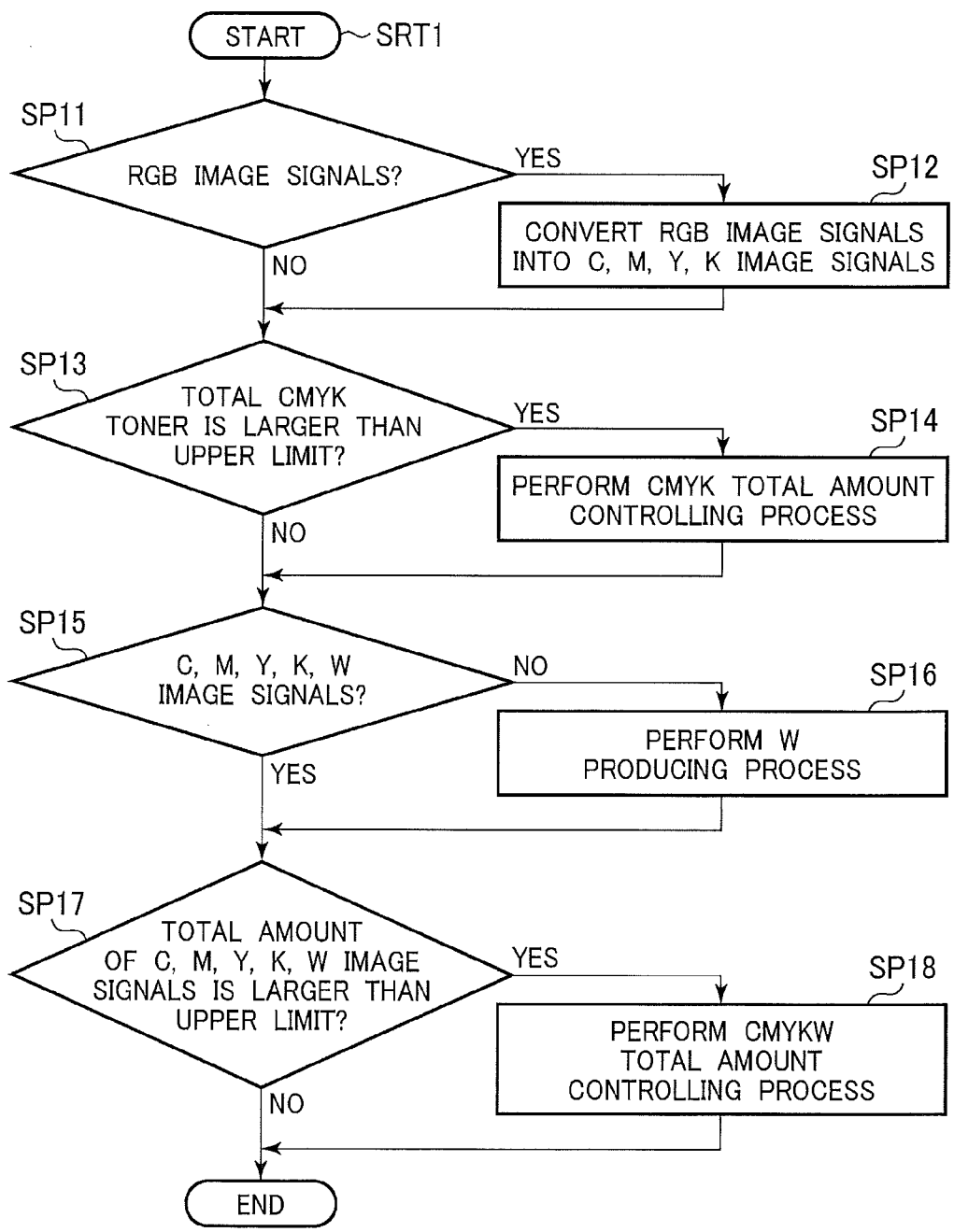
FIG. 8 is a flowchart illustrating a color conversion process.

FIG. 8 is a flowchart illustrating the color conversion process SRT. The controller 14 starts the color conversion process SRT shown in FIG. 8.

Step SP11: The color converting section 50 obtains the image signal from the rendering section 48, and determines whether the obtained image signals are RGB image signals. If the answer is YES, the color converting section proceeds to SP12 where the color resolving section 60 converts the RGB image signals into the C, M, Y, and K image signals. If the answer is NO, the color converting section 50 proceeds to SP13.

Step SP13: The total CMYK toner controller 62 of the color converting section 50 obtains the C, M, Y, and K image signals from either the color resolving section 60 or the rendering section 48. Alternatively, the color converting section 50 obtains the C, M, Y, and K image signals from the rendering section 48. A check is then made to determine whether the total amount of the CMYK toner is larger than the upper limit of the total amount of the C, M, Y, and K toners. If the answer is YES, the color converting section 50 proceeds to SP14 where the CMYK total amount controlling process is performed. If the answer is NO, the color converting section 50 proceeds to SP15.

Step SP15: The color converting section 50 makes a decision as to whether the image signals obtained from the rendering section 48 are the C, M, Y, K, and W image signals. If the answer is YES, the color converting section 50 proceeds to SP17. If the answer is NO, the color converting section 50 proceeds to SP16 where the W producing section 64 performs the W producing process to produce the W image signal that describes an amount of white toner on which C', M', Y', K' image signals are printed in underlayer printing.

Step SP17: The total CMYKW toner controller 66 in the color converting section 50 obtains the C'M'Y'K'W image signals from either the total CMYK toner controller 62 or the W producing section 64. The total CMYKW toner controller 66 then makes a decision as to whether the total amount of the C, M, Y, K, and W image signals is larger than the upper limit of the total amount of the C, M, Y, K, and W toners. If the answer is YES, the color converting section 50 proceeds to SP18 where the total CMYKW toner controller 66 performs the CMYKW total amount controlling process. If the answer is NO, the color converting section 50 ends the color conversion process SRT1.

{Halftone Process}

Figure 9:
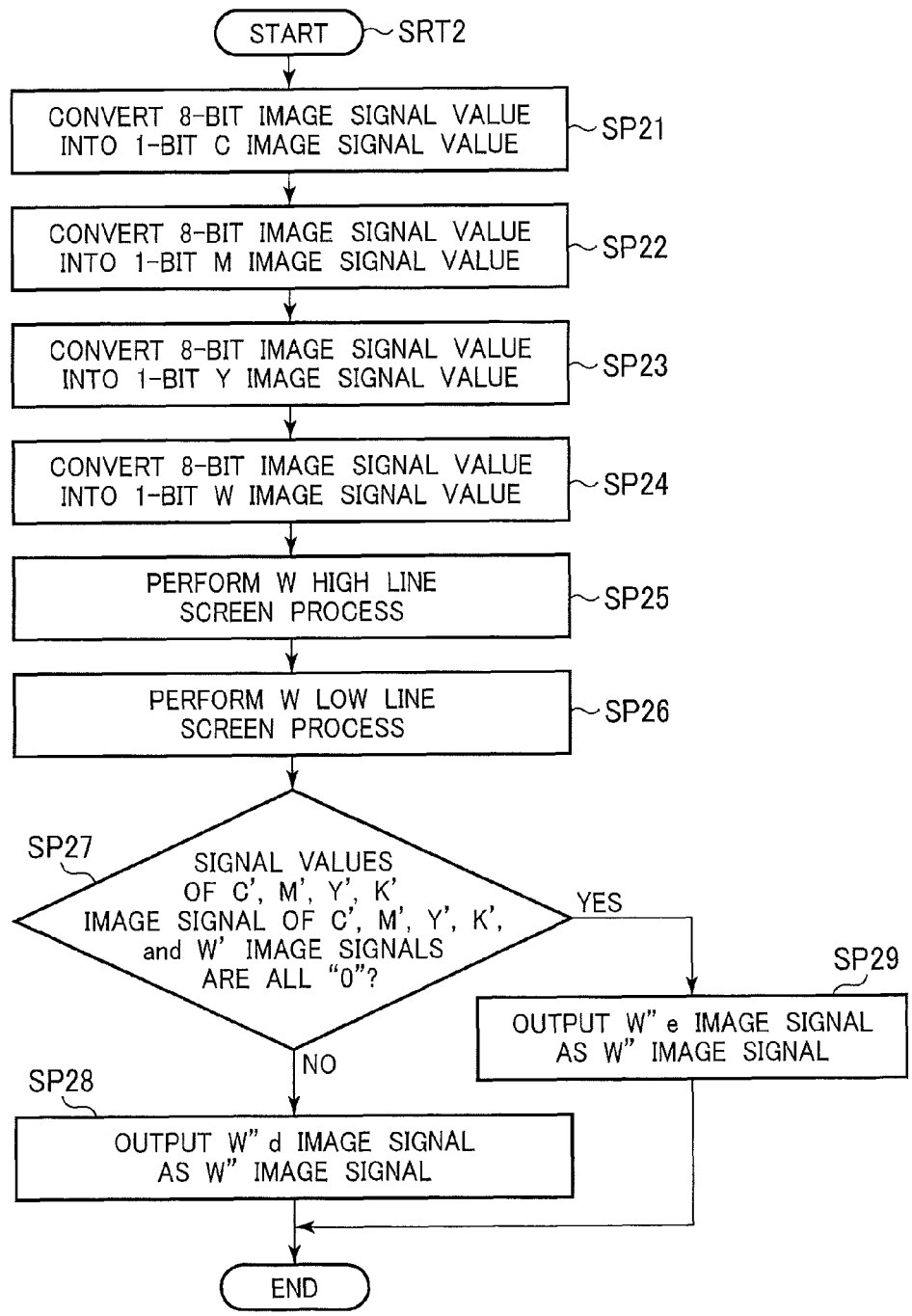
FIG. 9 is a flowchart illustrating a halftone process. process.

FIG. 9 is a flowchart illustrating the halftone process SRT2. At SP5 shown in FIG. 7, the controller 14 enters the procedure of the halftone process SRT2 shown in FIG. 9.

Step SP21: The CMYK screen processing section 70 of the halftone section 54 receives the C', M', Y', K', and W' image signals from the intermediate raster buffer 52. Using the C screen Sc, the CMYK screen processing section 70 converts the 8-bit C image signal value of the 8-bit C', M', Y', K', and W' image signals into a 1-bit C image signal value which can be printed by the print engine 12. The CMYK screen processing section 70 then provides the 1-bit C image signal value to the raster buffer 56.

Step SP22: Using the M screen Sm, the CMYK screen processing section 70 converts the 8-bit M image signal value of the 8-bit C', M', Y', K', and W' image signals into a 1-bit M image signal value, which can be printed by the print engine 12. The CMYK screen processing section 70 then provides the 1-bit M image signal value to the raster buffer 56.

Step SP23: Using the Y screen Sy, the CMYK screen processing section 70 converts the 8-bit Y image signal value of the 8-bit C', M', Y', K', and W' image signals into a 1-bit Y image signal value, which can be printed by the print engine 12. The CMYK screen processing section 70 then provides the 1-bit Y image signal value to the raster buffer 56.

Step SP24: Using the K screen Sk, the CMYK screen processing section 70 converts the 8-bit K image signal value of the 8-bit C', M', Y', K', and W' image signals into a 1-bit K image signal value, which can be printed by the print engine 12. The CMYK screen processing section 70 then provides the 1-bit K image signal value to the raster buffer 56.

Step SP25: The W large-number-of-lines screen processing section 72 of the halftone section 54 receives the 8-bit W' image signal of the 8-bit C', M', Y', K', and W' image signals. Using the W high line screen SWd, the W large-number-of-lines screen processing section 72 performs the W large-number-of-lines screen process to convert the 8-bit W image signal value into a 1-bit W"d image signal value, which can be printed by the print engine 12. The W large-number-of-lines screen processing section 72 then provides the 1-bit W"d image signal value to the W screen selector 76.

Step SP26: The W small-number-of-lines screen processing section 74 of the halftone section 54 receives the 8-bit W' image signal of the 8-bit C', M', Y', K', and W' image signals. Using the W low line screen SWe, the W small-number-of-lines screen processing section 74 performs the W low line screen process to convert the 8-bit W image signal value into a 1-bit W"e image signal value, which can be printed by the print engine 12. The W small-number-of-lines screen processing section 74 then provides the 1-bit W"e image signal value to the W screen selector 76.

Step SP27: The W screen selector 76 of the halftone section 54 makes a decision as to whether the signal values of the C', M', Y', and K' image signals of the C', M', Y', K', and W' image signals are all "0". If the answer is YES, it means that an image to be formed is a white image that should be printed in the white-only printing.

Step SP28: If the answer is NO at SP27, it means that an image to be formed should be printed in underlayer printing which uses the white and color toners. The W screen selector 76 outputs the W"d image signal, which is a 1-bit W image signal value produced through the W high line screen process, as a W" image signal to the raster buffer 56.

Step SP29: The W screen selector 76 outputs the W"e image signal as a W" image signal, which is 1-bit W image signal value that has been subjected to the W low line screen process, to the raster buffer 56.

{Effects}

The printer 1 with the above configuration applies the W low line screen SWe to the white toner for a white-only image, and applies the W high line screen SWd to the white toner for an image that uses the white toner and color toners including black toner. Thus, the printer 1 minimizes granular quality of white toner in a white-only image, and minimizes Moire interference that may occur between the white toner and the color toner, thereby improving the image quality.

The printer 1 includes the controller 14 and the W screen selector 76. The controller 14 forms an image using a white toner as a first developer material and at least one of cyan, magenta, black, and yellow toners as a second developer material. The W screen selector 76 makes a decision as to whether an image to be formed is a white-only image. Based on the decision, the W screen selector 76 switches between the W low line screen SWe as a first screen (FIG. 6A) and the W high line screen SWd as a second screen (FIGS. 5D and 6B). When an image is formed only of W toner, the first screen is applied to W. When an image is formed of C, M, Y, K, and W toners, the second screen is applied to W, the first screen is applied to K, and the third screen is applied to C, M, and Y. There is a relation among the number of lines as follows: (second screen)<(third screen)<(first screen).

The W low line screen SWe is applied to a white-only image to minimize granular quality while the W high line screen SWd is applied to an image formed of white and color toners to minimize Moire interference and improve image quality.

{Modifications}

The above embodiment has been described in terms of white toner used to form an underlayer. The invention is not limited to the white toner to form an underlayer. Any color may be used which effectively covers the base color of the recording medium and reflects the incident light transmitted through the color toners. Black toner has been described as a color toner printed on a white underlayer. Instead, a black layer may be printed as an underlayer and a white layer may be printed as a color layer on the black layer, in which case the signal processing procedure for the black toner layer and the signal processing procedure for the white toner layer can be interchanged.

The embodiment has been described in terms of the W screen selector 76 which is configured to switch between the W"d image signal and the W"e image signal on a pixel-to-pixel basis. The present invention is not limited to this and the W screen selector 76 may also be configured to switch between the W"d image signal and the W"e image signal on an object-to-object basis, on a page-to-page basis and so on. The W"d image signal and W"e image signal may be switched depending on a user selected basis.

The embodiment has been described with respect to the W large-number-of-lines screen processing section 72 that uses the W high line screen SWd having a larger number of raster lines than the color screens Sc, Sm, Sy, and Sk and the W low line screen SWe, and the W small-number-of-lines screen processing section 74 that uses the W low line screen SWe having a smaller number of raster lines than the W high line screen SWd. The W large-number-of-lines screen processing section 72 may use a non-periodical screen, for example, a frequency modulation (FM) screen, a random dot screen, or an error diffusion screen. The W small-number-of-lines screen processing section 74 may use an amplitude modulation (AM) screen.

FM screens express the density of an image by varying the population of dots having a fixed size in a unit area. In other words, an FM screen expresses the density of an image in terms of changes in frequency. The error diffusion screen is such that when the density of a dot of interest expressed in 256 gradation levels is compared with a threshold value to convert the dot of interest into a dot expressed in two levels, errors due to digitalization are diffused to dots right to, lower right to, and below the dot of interest. The FM screen is such that a highlight area is formed of separate points to produce gradation by FM modulation, each point being formed of several dots. Due to the nature of electrophotography, separate points formed of several dots are difficult to reproduce. As a result, the separate points have irregular shapes to increase granular quality leading to poor image quality. However, if white toner is used in underlayer printing in which color toner layers are formed on the white toner layer, Moire interference may be minimized.

Since the FM screen is not frequency dependent, when color toners are layered over white toner, Moire interference can be effectively minimized. As described above, by using a screen including the FM screen and error diffusion screen which are not frequency dependent, when color toners are layered over white toner, Moire interference can be effectively minimized. Although electrophotographic process tends to cause granular quality to develop, even when the white-only printing is performed using white toner, no granular quality of a white toner image is detectable since no color toner layer is formed on the white toner layer.

AM screen is such that the density of an image is expressed by varying the size of dots that are arranged with a fixed dot population per unit area. In other words, the density is expressed in terms of changes in amplitude. Since the AM screen has not frequency components, granular quality is difficult to occur and therefore image quality is not apt to become deteriorated. As described above, by using screens including the AM screen and error diffusion screen that are not frequency dependent, granular quality is difficult to occur in the white-only printing, and therefore image quality is difficult to become deteriorated. Since the AM screen is not frequency dependent, when color toners are layered over white toner, Moire interference is apt to occur. However, when the white-only printing is performed, Moire interference will not occur since color toner layers are not placed on the white toner layer.

Thus, the granular quality associated with a white-only image can be minimized by applying a frequency dependent screen. The Moire interference associated with an image formed of white toner and color toners can be minimized by applying a frequency independent screen. In this manner, image quality can be improved.

In the above-described embodiment, the W large-number-of-lines screen processing section 72 minimizes Moire interference by using the W high line screen SWd that has raster lines more than twice that of the color screens Sc, Sm, Sy, and Sk as a third screen (FIGS. 5A, 5B, and 5C). The invention is not limited to this, and can be practiced as long as the color screen and the W high line screen SWd have different number of raster lines.

The number of raster lines and the screen angle of the C screen Sc, M screen Sm, Y screen Sy, K screen Sk, W high line screen SWd, and W low line screen SWe are not limited to the aforementioned values, and can be a variety of values as long as Moire interference and granular quality can be minimized to prevent deterioration of image when the screens are layered one over the other.

The W large-number-of-lines screen processing section 72 produces the W"d image signal and the W small-number-of-lines screen processing section 74 produces the W"e image signal. Subsequently, the W screen selector 76 selectively outputs the W"d image signal and the W"e image signal. Alternatively, the W screen selector 76 may make a decision as to whether a white toner image should be outputted as a white-only image in the white only printing or as an underlayer in underlayer printing. Either the W large-number-of-lines screen processing section 72 or the W small-number-of-lines screen processing section 74 receives the W' image signal, and then produces either the W"d image signal or the W"e image signal.

The aforementioned embodiment employs four color toners: cyan (C) toner, magenta (M) toner, yellow (Y) toner, and black (K) toner. However, at least one of cyan (C), magenta (M) toner, yellow (Y) toner, and black (K) toner may be used.

The printer 1 has been described to have five image forming units 32 that print toner images of five colors. Any number of image forming units may be used, so that images of less than four colors or more than six colors may be printed.

The embodiment has been described with respect to an electrophotographic printer. The present invention may also be applied to a variety of apparatus including copying machines and facsimile machines which receive print data or scanned image data from an external apparatus and form images on a recording medium. The operation of the controller 14 may also be applicable to computers and printer servers that have not a mechanism for forming images.

Figure 10:
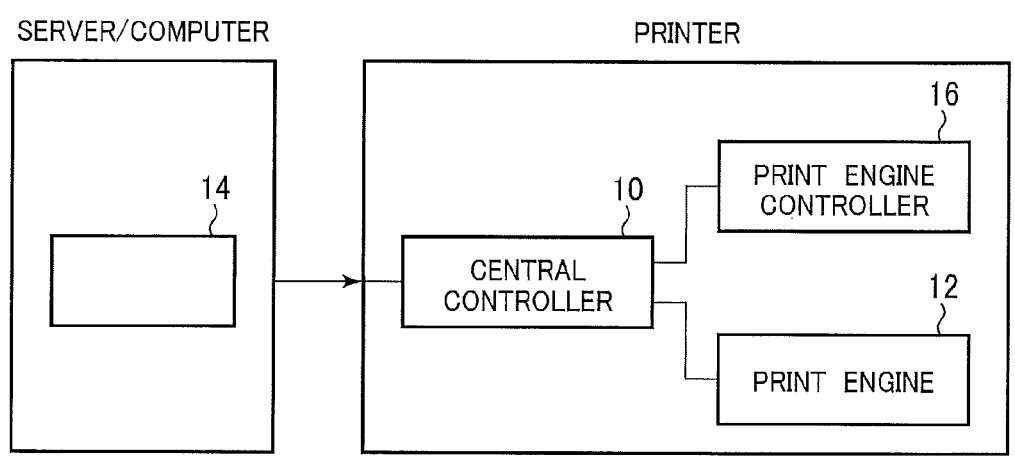
FIG. 10 illustrates an image forming system.

In the embodiment, the printer 1 has been described as having the print engine 12, the print engine controller 16, and the controller 14 which includes the W screen selector 76 which serves a determining section and selector. Instead, the present invention may be applicable to apparatus including computers and servers which do not include image forming sections but include a determining section and a selector, which are of a variety of configurations different from the embodiment. In other words, as shown in FIG. 10, a printing system can be configured using combining a conventional printer and a host apparatus, in which case, the printer includes a print engine and a print engine controller that controls the print engine, and the host apparatus includes the W screen selector 76 according to the first embodiment which serves as the determining section and the selector:

The present invention may be applied to a variety of electronic equipment including image scanners, facsimile machines, or copying machines in which a variety of image forming processes are performed.

What is claimed is:

1. An image forming apparatus, comprising:
a first image forming section that forms a first image of a white developer material on a print medium;
a second image forming section that forms a second image of a second developer material of a color different from white on the print medium;
a selector that selects one of a first halftone screen for a first printing mode in which the first image forming section forms the first image on the print medium but the second image forming section does not form the second image, and a second halftone screen for a second printing mode in which the first image forming section forms the first image on the print medium and the second image forming section forms the second image on the first image so that the first image and the second image are printed one over the other, the first halftone screen including a first number of raster lines per unit distance and the second halftone screen including a second number of raster lines per unit distance, the first number being smaller than the second number;
a controller that performs printing on the print medium so that, when the controller performs printing in the first printing mode, the controller drives the first image forming section applying the first halftone screen to the first image without applying the second screen to the first image, and, when the controller performs printing in the second printing mode, the controller drives the first image forming section to form the first image and the second image forming section to form the second image applying the second halftone screen to the first image without applying the first halftone screen to the first image; and
a discharging section that discharges the print medium after one of the first printing mode and the second printing mode has been performed.

2. The image forming apparatus according to claim 1, wherein, when the controller performs printing in the first printing mode, the controller drives the first image forming section applying only the first halftone screen to the first image, and, when the controller performs printing in the second printing mode, the controller drives the first image forming section to form the first image and the second image forming section to form the second image applying only the second halftone screen to the first image.

3. The image forming apparatus according to claim 1, wherein the first color is a color of an underlayer.

4. The image forming apparatus according to claim 3, wherein the second color is a color in a color image.

5. The image forming apparatus according to claim 4, wherein the second color includes at least cyan, magenta, and yellow.

6. The image forming apparatus according to claim 5, wherein the second color further includes black.

7. The image forming apparatus according to claim 1, wherein the first halftone screen has a first screen angle and the second halftone screen has a second screen angle different from the first screen angle.

8. The image forming apparatus according to claim 1, wherein the second number of raster lines differs from a third number of raster lines of a third halftone screen used for forming the image with the second developer material.

9. The image forming apparatus according to claim 8, wherein the second number of raster lines is larger than the third number of raster lines.

10. The image forming apparatus according to claim 1, wherein the first halftone screen has a screen angle of 45 degrees.

11. The image forming apparatus according to claim 1, wherein the first halftone screen is a frequency dependent screen and the second halftone screen is not a frequency dependent screen.

12. A method for forming an image, comprising:
determining in which of a first printing mode and a second printing mode an image should be formed, the first printing mode being such that the image is formed only of a first color developer material and the second printing mode being such that the image is formed with the first color developer material and a second color developer material;
using a first halftone screen to form the image with the first color developer material without using the second halftone screen when the first printing mode is selected, the first halftone screen including a first number of raster lines per unit distance; and
using a second halftone screen to form the image with the first color developer material without using the first halftone screen when the second printing mode is selected, the second halftone screen including a second number of raster lines per unit distance, the first number being smaller than the second number.

13. An image forming system configured to form an image using a first color developer material and a second color developer material that is different from the first color developer material, the image forming system comprising:
a host apparatus configured to produce print data; and
an image forming apparatus configured to form an image based on the print data;
wherein the host apparatus includes a controller configured to produce print data for a first image using a first halftone screen without using the second halftone screen when the first image is formed only of a first color developer material, and produce print data for a second image using a second halftone screen without using the first halftone screen when the second image is formed of the first color developer material and a second color developer material, the first halftone screen including a first number of raster lines per unit distance and the second halftone screen including a second number of raster lines per unit distance, the first number being smaller than the second number,
wherein the image forming apparatus includes a print engine that prints the image on a medium; and a print engine controller configured to drive print engine when the print engine prints the image.

14. An image forming apparatus, comprising:
a first image forming section that forms a first image of a first developer material of a first color on a print medium;
a second image forming section that forms a second image of a second developer material of black on the print medium;
a selector that selects one of a first halftone screen and a second halftone screen, the selector selecting the first halftone screen for a first printing mode in which the first image forming section forms the first image on the print medium but the second image forming section does not form the second image, the selector selecting a second halftone screen for a second printing mode in which the first image forming section forms the first image on the print medium and the second image forming section forms the second image on the first image so that the first image and the second image are printed one over the other, the first halftone screen including a first number of raster lines per unit distance and the second halftone screen including a second number of raster lines per unit distance, the first number being smaller than the second number;

a controller that drives the first image forming section in the first printing mode, and drives the first image forming section and the second image forming section in the second printing mode; and a discharging section that discharges the print medium after one of the first printing mode and the second printing mode has been performed.

15. The image forming apparatus according to claim 14, wherein the first number is smaller than the second number.

* * * * *